UNITED STATES PATENT OFFICE 2,644,759

PRINTING INK

Arthur J. Schroeder, Cincinnati, Ohio, assignor to Sterling Drug Inc., New York, N. Y., a corporation of Delaware No Drawing. Application July 9, 1951,
Serial No. 235,909

16 Claims. (Cl. 106—28)

This invention relates to new and improved printing inks, printing ink pigment pastes, and printing ink varnishes.

One of the chief problems arising in the manufacture, storage, shipping, and use of printing inks, printing ink varnishes, and particularly printing ink pigment pastes is the tendency of these compositions to become thixotropic and to increase in body on standing. In many cases, the composition eventually exhibits the phenomenon known as "livering," that is, the composition coagulates as a result of the gelatinization of the vehicle, so that it becomes non-workable. Heretofore, attempts to avoid these undesirable characteristics have involved the use of vehicles of low acid number and low viscosity, avoidance of certain pigments known to be likely to cause livering, and addition of certain surface-active agents to the ink or ink vehicle. However, these precautions have proved largely to be unsatisfactory, being restrictive as to choice of ink ingredients, and introducing such further difficulties as undesirable reduction in color strength of the composition, or, especially when surface-active agents proposed in the prior art are used, interference with the removal of water from the pigment paste and excessive bleeding.

It is an object of this invention to overcome the foregoing objections and to provide printing inks, printing ink pigment pastes, and printing ink varnishes which have high stability of viscosity and improved flow characteristics, and which are substantially non-bleeding. I have now discovered that compositions having these desired properties are obtained by adding to the ink, pigment paste or varnish a relatively small amount of a wetting agent obtained by condensing a polyethylenepolyamine with urea.

While there are no sharply defined limits to the proportion of the wetting agent to be employed, I have found that for practical purposes the amount of the polyethylenepolyamine-urea condensation product should be at least about 0.5%, and preferably about 1-2%, by weight of the varnish component of the ink, pigment paste, or varnish. The percentage of wetting agent can be as high as 7-8% or more, but for reasons of economy I prefer not to use such larger amounts of the wetting agent, since no particular advantage is thereby attained.

The printing ink pigment pastes and printing inks provided by my invention exhibit improved wetting of the pigment by the vehicle, better flow, decrease in thixotropic properties, reduced tendency to increase in body on aging, and substantially less bleeding of pigment and vehicle when compared on the one hand with ink compositions otherwise similarly prepared but with no wetting agent present, and on the other hand with analogous compositions containing other types of wetting agents, for example unmodified polyethylenepolyamines.

In accordance with my invention, the polyethylenepolyamine-urea condensation product is added at any stage during the formulation of the printing ink or ink vehicle. Thus, the wetting agent can be added to a printing ink varnish to produce an improved varnish, which can then be employed as a printing ink vehicle in a conventional flushing or grinding procedure to produce pigment pastes or printing inks embodying the aforesaid advantages of my invention. The incorporation of the wetting agent into a printing ink varnish can be carried out by merely mixing the two materials at room temperature. In general, however, I have found that it is advantageous to heat the wetting agent and the varnish while they are being mixed, for example, at 50–90° C. for 30–60 minutes. Alternatively, the wetting agent can be added during the flushing or grinding of pigment into an ink vehicle to produce an improved pigment paste or a printing ink, as desired. As another alternative, a mixture of the varnish, polyethylenepolyamine, and urea can be heated to bring about the interaction of the polyethylenepolyamine and urea, thus forming the wetting agent in the varnish.

The wetting agent which I employ in practicing my invention is readily obtained by condensing a polyethylenepolyamine with urea. This condensation is conveniently carried out by heating the polyethylenepolyamine with urea at about 80–180° C. The proportion of urea to polyethylenepolyamine employed in this condensation reaction can be varied over a considerable range while still affording products useful in carrying out my invention. For practical purposes, I generally prefer to employ one to four moles of polyethylenepolyamine per mole of urea.

The polyethylenepolyamines suitable for use in preparing the wetting agents employed in my invention are polyamines of the ethylenediamine series and include, for example, tetraethylenepentamine, triethylenetetramine, diethylenetriamine, pentaethylenehexamine, and the like. The polyamines containing 3–6 nitrogen atoms have been found to be the most suitable ones.

In particular, I prefer to employ a wetting agent obtained by the interaction of tetraethylenepentamine with urea. For the preparation of the tetraethylenepentamine-urea wetting agent, I prefer to use one to three moles of tetraethylenepentamine per mole of urea. I have found further that especially advantageous results are obtained when approximately two moles of tetraethylenepentamine per mole of urea are employed. When 0.7 mole or less of tetraethylenepentamine per mole of urea is employed in the reaction, the wetting agents thus obtained are somewhat difficult to dissolve in printing ink varnishes containing bodied drying oils such as bodied linseed oils. Thus, for example, it has been found that the condensation products obtained using respectively 0.66, 0.50, and 0.33 mole of tetraethylenepentamine per mole of urea are not generally adapted to use in this particular type of varnish.

My invention is adapted to use with a wide variety of ink compositions which contain conventional inorganic and organic pigments, both of the dry color and flushed color type, either resinated or non-resinated, in an ink vehicle. The varnishes in these inks can be either bodied oils, or solutions or dispersions of natural or synthetic resins in a suitable solvent. These resins are well-known in the printing art and include, for example, rosin, esterified rosins such as rosin-glycerol ester, maleic adduct of rosin, copal, shellac, alkyd resins, such as glycerol-phthalic anhydride-fatty acid resin, coumarone-indene resins, oil-modified phenol-formaldehyde resins, esterified tall oil, etc. My invention is particularly useful in preparing inks and pigment pastes containing azo pigments.

I have found that my invention affords particular advantage in the preparation of ink compositions, including lithographic inks, which contain as the varnish component a bodied vegetable drying oil such as linseed oil, China-wood or tung oil, perilla oil, soya bean oil, and the like, and to use with ink compositions containing as the varnish component a natural or synthetic resin dissolved or dispersed in a liquid hydrocarbon solvent, for example a mineral oil or petroleum fraction.

My invention is illustrated by the following examples without, however, being restricted thereto.

EXAMPLE 1

A. *Wetting agent*

190 pounds of tetraethylenepentamine was placed in a 50-gallon stainless steel kettle fitted with an agitator, a thermometer, and a cover, the cover being provided with a vent pipe about 2 inches in diameter and about 12 inches long. The tetraethylenepentamine was stirred, heating of the kettle was begun, and 60 pounds of urea was added in small portions to the warm teraethylenepentamine. The mixture was then stirred and slowly heated over a period of about ten hours, during which time the temperature was raised to a maximum of about 110° C. The evolution of ammonia from the reaction mixture began when the temperature reached about 90° C., and increased rapidly as the temperature reached 110° C. The evolution of ammonia became rapid enough to cause some foaming of the reaction mixture, and the rate at which the temperature was increased to 110° C. depended somewhat on the amount of foaming encountered. A total of about 30 pounds of ammonia was evolved from the reaction mixture. After ten hours, the rate of evolution of ammonia had substantially decreased and the reaction was terminated. There was obtained as the product of the reaction about 220 pounds of a pale brown liquid, amounting to about 25 gallons. It was found desirable to remove the product from the kettle while still hot since it increased rapidly in viscosity on cooling, changing from a freely-flowing liquid to a viscous semi-solid state.

B. *Printing ink varnish*

400 pounds of No. 1 Regular Varnish (aged linseed oil which had been heat-polymerized to a viscosity of approximately 22 poises at 25° C., having an acid number 11–17 and a color value of 15–17 on the Gardner 1933 Color Scale) was placed in a mixing machine with four pounds of the tetraethylenepentamine-urea condensation product obtained as described above in Part A and mixed for about 30 minutes at 75° C. The varnish thus obtained was allowed to cool and was subsequently employed as a flushing vehicle as described below in Part C.

C. *Pigment paste*

To the approximately 404 pounds of varnish obtained as described above in Part B, there was added a quantity of moist (water-wet) press cake of Resinated Barium Lithol (resinated with wood rosin) containing about 500 pounds of the pigment on a dry basis. After thorough mixing of these ingredients, 30 pounds of barium chloride was added thereto as a flushing aid, and after again thoroughly mixing the material, the water layer which separated from the pigment paste was removed. Portions of this pigment paste were reduced in viscosity, as desired, by addition of suitable amounts of low-viscosity varnishes such as No. 0 Regular Varnish (aged linseed oil which had been heat polymerized to a viscosity of approximately 11.4 poises at 25° C., having an acid number 12–16 and a color value of 15–17 on the Gardner 1933 Color Scale) and No. 000 Regular Varnish (aged linseed oil which had been heat-polymerized to a viscosity of approximately 2.3 poises at 25° C., having an acid number 6–11 and a color value of 15–17 on the Gardner 1933 Color Scale). The pigment pastes thus obtained were then vacuum dried at 50–55° C. until the moisture content was reduced to 1–2%. The ease with which the water content of these pastes was removed and the flow of the finished paste indicated excellent pigment wetting by the varnish.

EXAMPLE 2

A. *Wetting agent*

76 pounds of tetraethylenepentamine was placed in a closed 12-gallon stainless steel kettle provided with a charging port and a vent pipe at the top so arranged as to allow condensed water to drain outside the kettle. The kettle was equipped with an agitator, a thermometer, and was provided with sight glasses for observing any foaming. 3.6 pounds of water was added to the tetraethylenepentamine and heating of the mixture was begun. Twelve pounds of urea was then added in small portions. When all of the urea had been added, the charging port was closed and heating was continued until a final temperature of 180° C. was reached after five or six hours. The reaction was terminated when the evolution of ammonia from the reaction mixture had diminished to a very slow rate and no more water distilled from the reaction mixture. There was thus obtained as a product about 85 pounds (about 10 gallons) of a pale brown liquid which flowed freely while hot but changed to a viscous semi-solid on cooling to room temperature.

(In another experiment, the reaction was carried out as described above with the exception that the addition of water was omitted. The product obtained in this case was closely similar in properties to the above-described product except that the final product had a slightly higher viscosity. The urea dissolved more slowly using this procedure, but the reaction time was decreased slightly.)

B. *Printing ink varnish*

450 pounds of No. 1 Pale Varnish (alkali-refined linseed oil which had been heat-polymerized to a viscosity of approximately 22 poises at 25° C., having an acid number 6–10 and a color value of 6–11 on the Gardner 1933 Color Scale) was placed in a mixing machine with 4.5 pounds of the tetraethylenepentamine-urea condensation product obtained as described above in Part A. These materials were mixed for about 30 minutes at 75° C. The varnish thus obtained was then allowed to cool and was employed as a flushing vehicle in the manner set forth below.

C. *Printing ink pigment paste*

To the varnish obtained as described above in Part B, there was added a quantity of moist (water-wet) press cake of Resinated Red Lake C (resinated with wood rosin) containing about 500 pounds of the pigment on a dry basis. The pigment and the varnish were thoroughly mixed, 30 pounds of barium chloride was then added and mixed in thoroughly, and the water which separated from the pigment paste was removed. Portions of this flushed pigment paste were cut back to various desired viscosities with low-viscosity varnishes, and the respective pigment pastes were then vacuum dried at 50–55° C. to a moisture content of 1–2%. It was found that the water content of these pigment pastes was quickly adjusted to the desired low value and in this manner excellent pigment wetting was indicated by this drying behavior, as was also shown by the flow of the finished pigment paste.

D. *Printing inks*

The Resinated Red Lake C pigment paste obtained above as described in Part C, the Resinated Barium Lithol pigment paste obtained as described above in Example 1C, and a non-resinated Barium Lithol pigment paste prepared in a manner analogous to the procedure of Example 1C, and containing a tetraethylenepentamine-urea condensation product, were each incorporated into a printing ink vehicle to form a printing ink containing the following ingredients, these ingredients being compounded in conventional fashion:

| | Parts by weight |
|---|---|
| Pigment paste | 6.00 |
| No. 1 Regular Varnish | 3.50 |
| Calcium Carbonate White Extender | 5.00 |
| Modifier | 0.50 |
| Drier | 0.25 |
| Totals | 15.25 |

The modifier in the formula above consisted of a mixture of ceresine wax, beeswax, and cornstarch, and the drier was a balanced cobalt-manganese-lead drier containing 0.5% cobalt, 10.0% lead and 2.0% manganese in aged linseed oil. The three inks obtained in this manner were compared with a similar inks lacking only the wetting agent and it was found that the former inks, prepared in accordance with my invention, had better body and viscosity stability, better press flow, and substantially less tendency to bleed than the latter inks.

EXAMPLE 3

100 parts by weight of a maleic acid adduct of rosin (a resin having a softening point of 143° C., specific gravity 1.14, and an acid value of 37) was dissolved in 100 parts by weight of an aromatic petroleum fraction boiling at 172–190° C. To the hot solution there was then added two parts by weight of the tetraethylenepentamine-urea condensation product obtained as described above in Example 2A, the temperature being held at 90° C. for about 30 minutes.

When the varnish obtained in this manner is used as a flushing varnish to flush a moist pigment pulp, or alternatively, when the varnish is ground with a dry pigment, there is obtained in each instance a printing ink pigment paste which has improved body and flow and reduced tendency to increase in body on aging when compared with a pigment paste of similar composition but lacking the tetraethylenepentamine-urea condensation product.

EXAMPLE 4

34 parts by weight of tall oil (analysis: fatty acids, 43.3%; rosin acids, 51.0%; unsaponifiable material, 5.7%) having an acid value of 165 was heated with six parts by weight of pentaerythritol at about 118° C. until the acid value of the mixture was reduced to 20–25. To this mixture there was added 40 parts by weight of mineral oil having a viscosity of 1200 poises at 100° C. There was then added 0.8 part by weight of tetraethylenepentamine-urea condensation product obtained as described above in Example 2A and the mixture was heated to 75° C. and held at this temperature for about 30 minutes.

By employing this varnish as a flushing varnish to flush a moist pigment pulp, there is obtained a printing ink pigment paste having good flow, excellent vacuum drying characteristics, and little or no tendency to increase in body even on accelerated aging at 70° C.

EXAMPLE 5

*Printing ink pigment paste*

15.00 parts of No. 1 Regular Varnish, 12.00 parts of dry Red Lake C, and 0.27 part of tetraethylenepentamine-urea condensation product (all parts being by weight) obtained as described above in Example 2A were ground together in a roller mill in conventional fashion to produce a pigment paste. Another pigment paste was then prepared in similar manner but omitting the tetraethylenepentamine-urea condensation product. These two pigment pastes were compared and it was found that the pigment paste containing the tetraethylenepentamine-urea condensation product had much better body, flow, and viscosity stability characteristics, and showed substantially less tendency to exhibit color bleeding.

EXAMPLE 6

Proceeding in the manner set forth above in Example 1A, approximately equimolecular quantities of triethylenetetramine and urea were heated together at 90–110° C. to produce a triethylenetetramine-urea condensation product which consisted of a viscous pale brown liquid. Approximately one part by weight of this product was mixed with 100 parts by weight of No. 1 Regular Varnish to produce a flushing varnish which was then employed to flush Resinated Barium Lithol pulp. There was thus obtained a pigment paste which exhibited better body, flow, and viscosity stability characteristics than a pigment paste otherwise similarly prepared but lacking the triethylenetetramine-urea condensation product.

Proceeding in the manner of the above examples, printing ink pigment pastes and printing inks can be obtained which contain a polyethylenepolyamine-urea condensation product and wherein the pigment is Toluidine Red, Calcium Lithol, Strontium Lithol, Sodium Lithol, Red Lake D, Methyl Violet Phosphotungstic-Phosphomolybdic Lakes, Peacock Blue Lake, Chrome Yellow, Iron Blue, etc. The pigment pastes and printing inks so obtained exhibit improved pigment wetting, body, flow and viscosity stability when compared with similar compositions not containing the polyethylenepolyamine-urea condensation product.

I claim:

1. A pigment paste suitable for incorporation into a printing ink which comprises a pigment, a printing ink varnish, and a small amount of a wetting agent obtained by heating a polyethylenepolyamine containing 3-6 nitrogen atoms with urea in the ratio of 1-4 moles of polyethylenepolyamine per mole of urea.

2. A pigment paste suitable for incorporation into a printing ink which comprises a pigment, a printing ink varnish, and a small amount of a wetting agent obtained by heating tetraethylenepentamine with urea in the ratio of 1-4 moles of tetraethylenepentamine per mole of urea.

3. A pigment paste suitable for incorporation into a printing ink which comprises a pigment, a bodied vegetable drying oil, and a small amount of a wetting agent obtained by heating tetraethylenepentamine with urea in the ratio of 1-4 moles of tetraethylenepentamine per mole of urea.

4. A pigment paste suitable for incorporation into a printing ink which comprises a pigment, a printing ink varnish comprising a resin and a liquid organic solvent, and a small amount of a wetting agent obtained by heating tetraethylenepentamine with urea in the ratio of 1-4 moles of tetraethylenepentamine per mole of urea.

5. A pigment paste suitable for incorporation into a printing ink which comprises a pigment, a bodied linseed oil, and a small amount of a wetting agent obtained by heating tetraethylenepentamine with urea in the ratio of 1-4 moles of tetraethylenepentamine per mole of urea.

6. A pigment paste suitable for incorporation into a printing ink which comprises a pigment, a bodied linseed oil, and a small amount of a wetting agent obtained by heating tetraethylenepentamine with urea in the ratio of approximately two moles of tetraethylenepentamine per mole of urea.

7. A printing ink comprising a pigment, a solvent component, a printing ink varnish, and a small amount of a wetting agent obtained by heating a polyethylenepolyamine containing 3-6 nitrogen atoms with urea in the ratio of 1-4 moles of polyethylenepolyamine per mole of urea.

8. A printing ink comprising a pigment, a solvent component, a printing ink varnish, and a small amount of a wetting agent obtained by heating tetraethylenepentamine with urea in the ratio of 1-4 moles of tetraethylenepentamine per mole of urea.

9. A printing ink comprising a pigment and a printing ink vehicle comprising a bodied vegetable drying oil and a small amount of a wetting agent obtained by heating tetraethylenepentamine with urea in the ratio of 1-4 moles of tetraethylenepentamine per mole of urea.

10. A printing ink comprising a pigment and a printing ink vehicle comprising a bodied linseed oil and a small amount of a wetting agent obtained by heating tetraethylenepentamine with urea in the ratio of 1-4 moles of tetraethylenepentamine per mole of urea.

11. A printing ink comprising a pigment and a printing ink vehicle comprising a bodied linseed oil and a small amount of a wetting agent obtained by heating tetraethylenepentamine with urea in the ratio of approximately two moles of tetraethylenepentamine per mole of urea.

12. A printing ink vehicle comprising a printing ink varnish and a small amount of a wetting agent obtained by heating a polyethylenepolyamine containing 3-6 nitrogen atoms with urea in the ratio of 1-4 moles of polyethylenepolyamine per mole of urea.

13. A printing ink vehicle comprising a printing ink varnish and a small amount of a wetting agent obtained by heating tetraethylenepentamine with urea in the ratio of 1-4 moles of tetraethylenepentamine per mole of urea.

14. A printing ink vehicle comprising a bodied vegetable drying oil and a small amount of a wetting agent obtained by heating tetraethylenepentamine with urea in the ratio of 1-4 moles of tetraethylenepentamine per mole of urea.

15. A printing ink vehicle comprising a bodied linseed oil and a small amount of a wetting agent obtained by heating tetraethylenepentamine with urea in the ratio of 1-4 moles of tetraethylenepentamine per mole of urea.

16. A printing ink vehicle comprising a bodied linseed oil and a small amount of a wetting agent obtained by heating tetraethylenepentamine with urea in the ratio of approximately two moles of tetraethylenepentamine per mole of urea.

ARTHUR J. SCHROEDER.

References Cited in the file of this patent

UNITED STATES PATENTS

| Number | Name | Date |
| --- | --- | --- |
| 2,145,242 | Arnold | Jan. 31, 1939 |
| 2,285,183 | Bernardi | June 7, 1942 |
| 2,450,534 | Voet | Oct. 5, 1948 |
| 2,559,584 | Barker | July 10, 1951 |

OTHER REFERENCES

Gregory: Uses & Applications of Chemicals & Related Materials, vol. II (1944), page 186.

Zettlemoyer: "Ind. & Eng. Chem.," 41, pages 1501-4, 1950.

Carr: "Official Digest of the Paint & Varnish Production Clubs," Aug. 1951, presented to the Birmingham Club, April 5, 1951, pages 510-516.